United States Patent
Lee et al.

(10) Patent No.: US 9,447,751 B2
(45) Date of Patent: Sep. 20, 2016

(54) HYBRID FUEL SUPPLY SYSTEM AND METHOD FOR ENGINE OF VESSEL

(71) Applicant: DAEWOO SHIPBUILDING & MARINE ENGINEERING CO., LTD., Seoul (KR)

(72) Inventors: Joon Chae Lee, Daegu (KR); Dong Kyu Choi, Seongnam-si (KR); Young Sik Moon, Gwangmyeong-si (KR); Seung Kyo Jung, Seoul (KR); Jeheon Jung, Seoul (KR); Nam Soo Kim, Suwon-si (KR)

(73) Assignee: DAEWOO SHIPBUILDING & MARINE ENGINEERING CO., LTD., Seoul (KR)

( * ) Notice: Subject to any disclaimer, the term of this patent is extended or adjusted under 35 U.S.C. 154(b) by 0 days.

(21) Appl. No.: 14/360,101

(22) PCT Filed: Oct. 24, 2013

(86) PCT No.: PCT/KR2013/009539
§ 371 (c)(1),
(2) Date: May 22, 2014

(87) PCT Pub. No.: WO2014/065617
PCT Pub. Date: May 1, 2014

(65) Prior Publication Data
US 2015/0285189 A1    Oct. 8, 2015

(30) Foreign Application Priority Data

Oct. 24, 2012  (KR) .......................... 10-2012-0118241
May 23, 2013  (KR) .......................... 10-2013-0058586

(51) Int. Cl.
*F02B 3/06*   (2006.01)
*F02M 21/02*  (2006.01)
(Continued)

(52) U.S. Cl.
CPC ........ *F02M 21/0209* (2013.01); *F02D 19/021* (2013.01); *F02M 21/0215* (2013.01);
(Continued)

(58) Field of Classification Search
CPC ...... F02D 19/10; F02D 41/0027; F02B 3/06; F02B 7/06; F02M 21/02
USPC ...................................................... 123/27 GE
See application file for complete search history.

(56) References Cited

U.S. PATENT DOCUMENTS 9,168,993 B1  10/2015  Lee et al.
9,239,186 B2  1/2016   Jung et al.
(Continued)

FOREIGN PATENT DOCUMENTS

CN   102648124 A    8/2012
JP   2010-173483 A  8/2010
(Continued)

OTHER PUBLICATIONS

International Search Report and written opinion dated Feb. 6, 2014 of PCT/KR2013/009539 which is the parent application—11 pages.
(Continued)

*Primary Examiner* — Lindsay Low
*Assistant Examiner* — Charles Brauch
(74) *Attorney, Agent, or Firm* — Knobbe Martens Olson & Bear LLP

(57) ABSTRACT

A hybrid fuel supply system for an engine of a vessel is provided. The hybrid fuel supply system for the engine of the vessel includes: a compression device configured to compress boil-off gas (BOG) generated from liquefied natural gas (LNG) stored in an LNG cargo tank; a high pressure pump configured to compress LNG supplied from the LNG cargo tank; a vaporizer configured to vaporize the LNG compressed by the high pressure pump; and a dual fuel (DF) engine to which the BOG compressed through the compression device is supplied as fuel. The engine of the vessel uses high pressure gas compressed at 150 to 400 bar as fuel and is driven by at least one of the BOG compressed in the compression device and the LNG compressed in the high pressure pump.

6 Claims, 4 Drawing Sheets

(51) Int. Cl.
*F02D 19/02* (2006.01)
*F02M 21/06* (2006.01)
*F17C 7/04* (2006.01)
*F17C 13/00* (2006.01)
*F02B 7/06* (2006.01)
*F02D 41/00* (2006.01)
*F02D 19/10* (2006.01)
*B63H 21/38* (2006.01)
*B63J 99/00* (2009.01)

(52) U.S. Cl.
CPC ..... *F02M21/0221* (2013.01); *F02M 21/0224* (2013.01); *F02M 21/0245* (2013.01); *F02M 21/06* (2013.01); *F17C 7/04* (2013.01); *F17C 13/004* (2013.01); *B63H 21/38* (2013.01); *B63J 2099/003* (2013.01); *F02B 3/06* (2013.01); *F02B 7/06* (2013.01); *F02D 19/10* (2013.01); *F02D 41/0027* (2013.01); *F02M 21/02* (2013.01); *Y02T 10/32* (2013.01); *Y02T 10/36* (2013.01); *Y02T 70/5263* (2013.01)

(56) References Cited

U.S. PATENT DOCUMENTS

| | | | | |
|---|---|---|---|---|
| 2008/0190117 | A1* | 8/2008 | Lee | F17C 3/00 62/47.1 |
| 2008/0276627 | A1* | 11/2008 | Lee | F17C 9/02 62/7 |
| 2013/0340474 | A1 | 12/2013 | Jung et al. | |
| 2014/0053600 | A1 | 2/2014 | Jung et al. | |
| 2014/0060110 | A1 | 3/2014 | Jung et al. | |
| 2014/0069118 | A1 | 3/2014 | Jung et al. | |
| 2014/0290279 | A1 | 10/2014 | Lee et al. | |
| 2015/0226379 | A1 | 8/2015 | Lee et al. | |
| 2015/0300301 | A1 | 10/2015 | Lee et al. | |

FOREIGN PATENT DOCUMENTS

| | | |
|---|---|---|
| KR | 10-2010-0044420 A | 4/2010 |
| KR | 10-2011-0118605 A | 10/2011 |
| KR | 10-2012-0049199 A | 5/2012 |
| KR | 10-2012-0049731 A | 5/2012 |
| KR | 10-2012-0107832 A | 10/2012 |
| RU | 90178 U1 | 12/2009 |
| SU | 838273 A1 | 6/1981 |
| WO | 2009136793 A1 | 11/2009 |
| WO | 2011078689 A1 | 6/2011 |
| WO | 2012128447 A1 | 9/2012 |
| WO | 2012128448 A1 | 9/2012 |
| WO | 2012128449 A1 | 9/2012 |

OTHER PUBLICATIONS

"Hyundai LNG Carrier—Now and in the Future", Presented at SHIP Efficiency 2013, Sep. 23, 2013—46 pages.

* cited by examiner

HYBRID FUEL SUPPLY SYSTEM AND METHOD FOR ENGINE OF VESSEL

TECHNICAL FIELD

The present invention relates to a hybrid fuel supply system for an engine of a vessel, and more particularly, to a hybrid fuel supply system for an engine of a vessel, which can supply boil-off gas (BOG) or liquefied natural gas (LNG) stored in an LNG cargo tank to a high pressure gas injection engine, i.e., propulsion means as fuel.

BACKGROUND ART

Liquefied natural gas (hereinafter, referred to as LNG) is a colorless and transparent liquid that can be obtained by cooling and liquefying natural gas (predominantly methane) to about −162° C. LNG takes up about 1/600th the volume of natural gas. Therefore, if natural gas is liquefied to LNG, natural gas can be very efficiently transported. For example, an LNG carrier is used to transport LNG by sea.

Since the liquefaction temperature of natural gas is a cryogenic temperature of −163° C. at ambient pressure, LNG is likely to be vaporized even when the temperature of LNG is slightly higher than −163° C. at ambient pressure. In the case of a conventional LNG carrier, even though an LNG cargo tank is thermally insulated, external heat is continuously transferred to LNG. Therefore, during the transportation of LNG by the LNG carrier, LNG is continuously naturally vaporized within the LNG cargo tank and boil-off gas (hereinafter, referred to as BOG) is generated within the LNG cargo tank.

BOG is a type of LNG loss and is an important problem in terms of LNG transportation efficiency. If BOG is accumulated in the LNG cargo tank, a pressure inside the LNG cargo tank is excessively increased. Hence, there is a risk of damage in the LNG cargo tank. Therefore, a variety of methods have been developed to process BOG.

Recently, in order for processing BOG, a method of reliquefying BOG and returning the reliquefied BOG to a cargo tank, a method of using BOG as an energy source for an engine of a vessel, and the like have been used. In addition, a method of burning surplus BOG in a gas combustion unit (GCU) has been used.

When BOG is not useful any more, the GCU inevitably burns surplus BOG so as to adjust the pressure of the cargo tank, resulting in a waste of chemical energy the BOG has.

In a case where a dual fuel (DF) engine is applied as a propulsion system of an LNG carrier, BOG generated in the LNG cargo tank can be processed by using it as a fuel of the DF engine. When an amount of BOG generated in the LNG cargo tank exceeds an amount of fuel used in the DF engine for propulsion of a vessel, BOG may be transferred to the GCU and be burnt for protecting the LNG cargo tank.

DISCLOSURE

Technical Problem

The DF engine has been used as the propulsion system for the vessel, and engines using the injection of high pressure gas have been developed. In such a propulsion system, the ship classification regulation requires the redundancy of the engine fuel supply apparatus in preparation for suspension of navigation due to malfunctions.

As illustrated in FIG. 1, two sets of compression devices 10 and 20 are required when a high pressure gas injection engine in an LNG carrier or the like is configured in a propulsion system and BOG generated during the transportation of LNG is supplied as the fuel of the engine of the vessel. However, extra equipment unused for the redundancy regulation is a very heavy burden in terms of costs. In particular, since a compressor for compressing BOG at a high pressure is expensive, cost burden is increased. In addition, when LNG is fully loaded in a cargo tank, a large amount of BOG is generated. Therefore, BOG can be compressed and supplied as fuel. However, when LNG is unloaded, an amount of LNG loaded in the cargo tank is small and thus a small amount of BOG is generated. Therefore, it is necessary to forcibly generate BOG.

As illustrated in FIG. 2, in the case of the high pressure gas injection engine configured to be supplied with LNG instead of BOG as fuel after pumping and vaporization, two sets of pumps 30 and 40 are required. However, since the price of the pump is relatively lower than the price of the compressor, cost burden on possession of equipment can be reduced. Since LNG stored in the cargo tank is consumed, a stable fuel supply can be achieved. On the other hand, a large amount of BOG generated in the full loading of the LNG may not be utilized, and BOG reliquefaction apparatuses are required.

Therefore, there is a need for fuel supply systems that are cost-efficient, can sufficiently utilize generated BOG, and can propel a vessel by the fuel stably supplied even when a small amount of BOG is generated.

Technical Solution

According to an aspect of the present invention, a hybrid fuel supply system for an engine of a vessel includes: a compression device configured to compress boil-off gas (BOG) generated from liquefied natural gas (LNG) stored in an LNG cargo tank; a high pressure pump configured to compress LNG supplied from the LNG cargo tank; a vaporizer configured to vaporize the LNG compressed by the high pressure pump; and a dual fuel (DF) engine to which the BOG compressed through the compression device is supplied as fuel, wherein the engine of the vessel uses high pressure gas compressed at 150 to 400 bar as fuel and is driven by at least one of the BOG compressed in the compression device and the LNG compressed in the high pressure pump.

The compression device may be a multi-stage compressor including a plurality of compressors and a plurality of intercoolers.

The DF engine may be supplied with the BOG compressed through at least a part of the plurality of compressors included in the multi-stage compressor.

The hybrid fuel supply system may further include a gas combustion unit (GCU) configured to burn the BOG remaining after supply as the fuel of the engine of the vessel and the DF engine.

The hybrid fuel supply system may further include a fuel pump provided in the LNG cargo tank and configured to supply the LNG stored in the LNG cargo tank to the high pressure pump.

A reliquefaction system using a separate refrigerant cycle may not be provided for reliquefaction of the BOG.

When the vessel is in a laden condition, the engine of the vessel may be supplied with the BOG compressed by the compression device as fuel.

When the vessel is in a ballast condition, the engine of the vessel may be supplied with the LNG compressed by the high pressure engine as fuel.

When the vessel is in a ballast condition, the engine of the vessel may be supplied with at least one of the BOG compressed by the compression device and the LNG compressed by the high pressure pump as fuel.

The vessel may be an LNG carrier having a capacity of 130,000 to 350,000 m$^3$.

According to another aspect of the present invention, a hybrid fuel supply method for an engine of a vessel includes: compressing and supplying BOG when an amount of the BOG generated from LNG stored in an LNG cargo tank satisfies an amount of fuel necessary for the engine of the vessel; and supplying LNG to the engine of the vessel after compression and forcible vaporization when an amount of the BOG generated from the LNG is smaller than an amount of fuel necessary for the engine of the vessel, wherein the engine of the vessel uses high pressure gas compressed at a high pressure of 150 to 400 bar as fuel, and the BOG compressed through at least a part of multi-stage compression steps is supplied to a DF engine provided in the vessel.

According to another aspect of the present invention, a hybrid fuel supply system for an engine of a vessel includes: a first passage connected to an LNG cargo tank of the vessel and configured such that BOG generated from LNG stored in the LNG cargo tank is supplied to a high pressure gas injection engine of the vessel; a second passage configured such that the LNG stored in the LNG cargo tank is pumped and vaporized and is then supplied to the high pressure gas injection engine; and a compression device provided on the first passage to compress the BOG, wherein the high pressure gas injection engine uses high pressure gas compressed at a high pressure of 150 to 400 bar as fuel. The hybrid fuel supply system may further include a third passage branched from the first passage, wherein a DFDE supplied with the BOG is provided on the third passage.

In the hybrid fuel supply system according to the embodiment of the present invention, when an amount of BOG generated in the LNG cargo tank satisfies an amount of fuel necessary for the high pressure gas injection engine, the BOG may be supplied through the first passage, and when an amount of BOG generated in the LNG cargo tank is smaller than an amount of fuel necessary for the high pressure gas injection engine, the pumped and vaporized LNG may be supplied.

The compression device may be configured in a multi-stage including a plurality of compressors and a plurality of intercoolers.

The DFDE may be supplied with BOG compressed through at least a part of the compressors.

The compressor device may be provided with only one set configured in a multi-stage.

A high pressure pump and a vaporizer may be provided on the second passage. The high pressure pump may be supplied with the LNG from the LNG cargo tank and pumps the LNG at a high pressure. The vaporizer vaporizes the LNG pumped by the high pressure pump and supplies the vaporized LNG to the high pressure gas injection engine.

The hybrid fuel supply system for the engine of the vessel according to the embodiment of the present invention may further include an FG pump provided in the LNG cargo tank and configured to supply the LNG to the high pressure pump.

A plurality of high pressure pumps may be provided. In this case, the plurality of high pressure pumps may be provided in parallel.

In the hybrid fuel supply system for the engine of the vessel according to the embodiment of the present invention, a reliquefaction system using a separate refrigerant cycle may not be provided for reliquefaction of the BOG.

When the vessel is in a laden condition, the high pressure gas injection engine may be driven by the BOG compressed by the compression device.

When the vessel is in a ballast condition, the LNG stored in the LNG cargo tank may be supplied to the high pressure gas injection engine after pumping and vaporization.

When the vessel is in the ballast condition, the BOG generated in the LNG cargo tank may be compressed and then supplied to the DFDE or the high pressure gas injection engine.

According to another aspect of the present invention, there is provided a hybrid fuel supply method for an engine of a vessel, in which BOG generated from LNG stored in the LNG cargo tank of the vessel is compressed and then supplied to a high pressure gas injection engine, or LNG is supplied to the high pressure gas injection engine after pumping and forcible vaporization, such that the BOG or the LNG is selectively supplied to the high pressure gas injection engine, wherein the high pressure gas injection engine uses the high pressure gas compressed at a high pressure of 150 to 400 bar as fuel, and the BOG is branched and supplied to the DFDE.

A compression device configured to compress the BOG may be provided with only set configured in a multi-stage including a plurality of compressors and a plurality of intercoolers.

Advantageous Effects

In the hybrid fuel supply system for the engine of the vessel according to the present invention, the first passage and the second passage are provided in the vessel equipped with the high pressure gas injection engine, and therefore, the redundancy of the fuel supply can be achieved without extra separate equipment that is not used.

According to the present invention, BOG and LNG can be selectively supplied as the fuel of the high pressure gas injection engine. Therefore, it is possible to solve the problem that forcibly generates BOG for fuel supply to the high pressure gas injection engine due to the deficiency in the generation amount of BOG in the ballast condition of the vessel. It is also possible to save costs involved in reliquefying a large amount of BOG in the laden condition.

In addition, a large amount of BOG generated in the LNG cargo tank is compressed and then supplied as the fuel of the high pressure gas injection engine. Therefore, it is possible to effectively utilize BOG while reducing an amount of BOG wasted by combustion in the GCU. When a small amount of BOG is generated, the system is configured to supply LNG to the high pressure gas injection engine. Therefore, the fuel can be stably supplied.

DETAILED DESCRIPTION OF EXEMPLARY EMBODIMENTS

Figure 1:
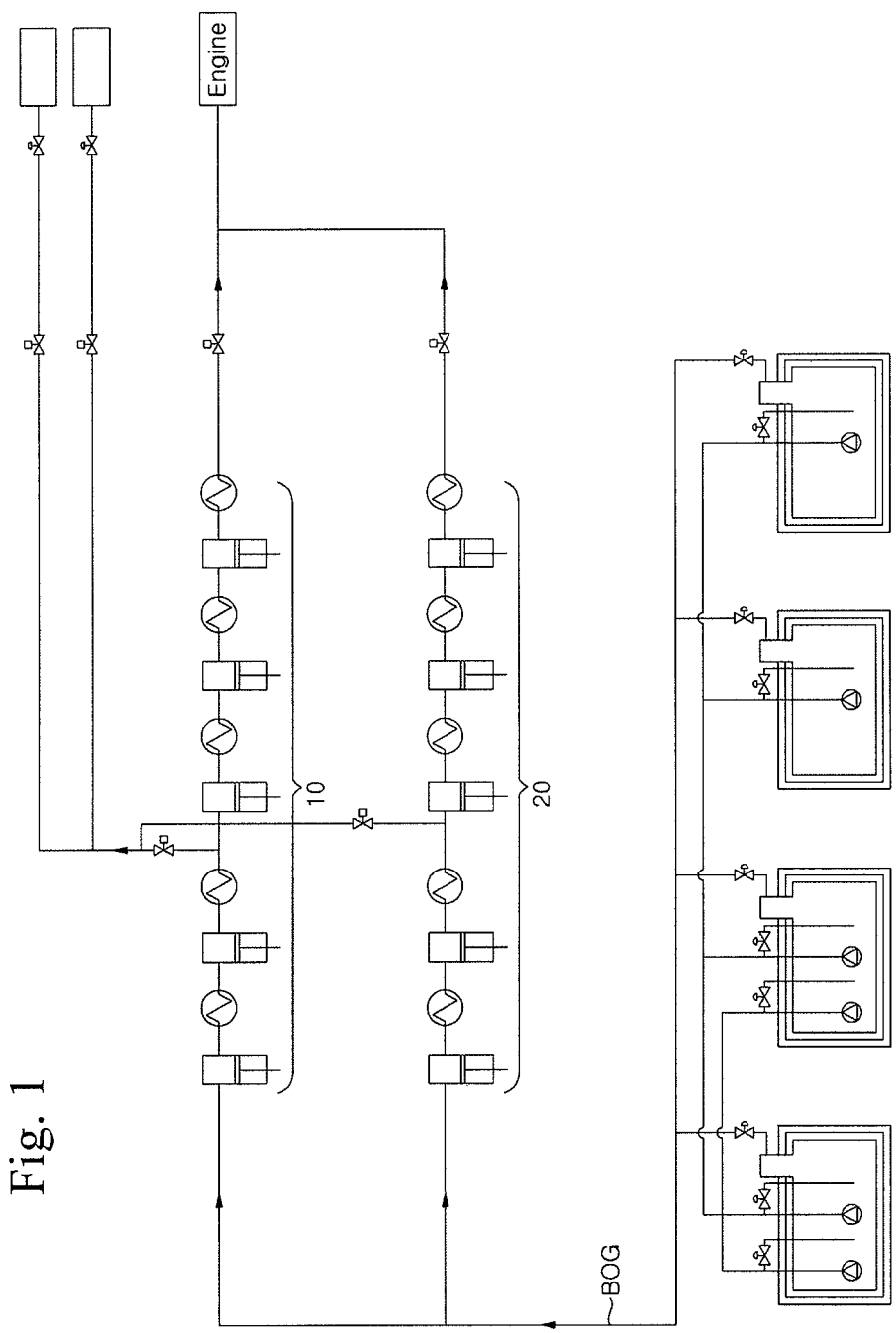
FIG. 1 illustrates a system that includes two sets of compression devices for redundancy of a fuel supply apparatus and supplies BOG to a high pressure gas injection engine as fuel.
Figure 2:
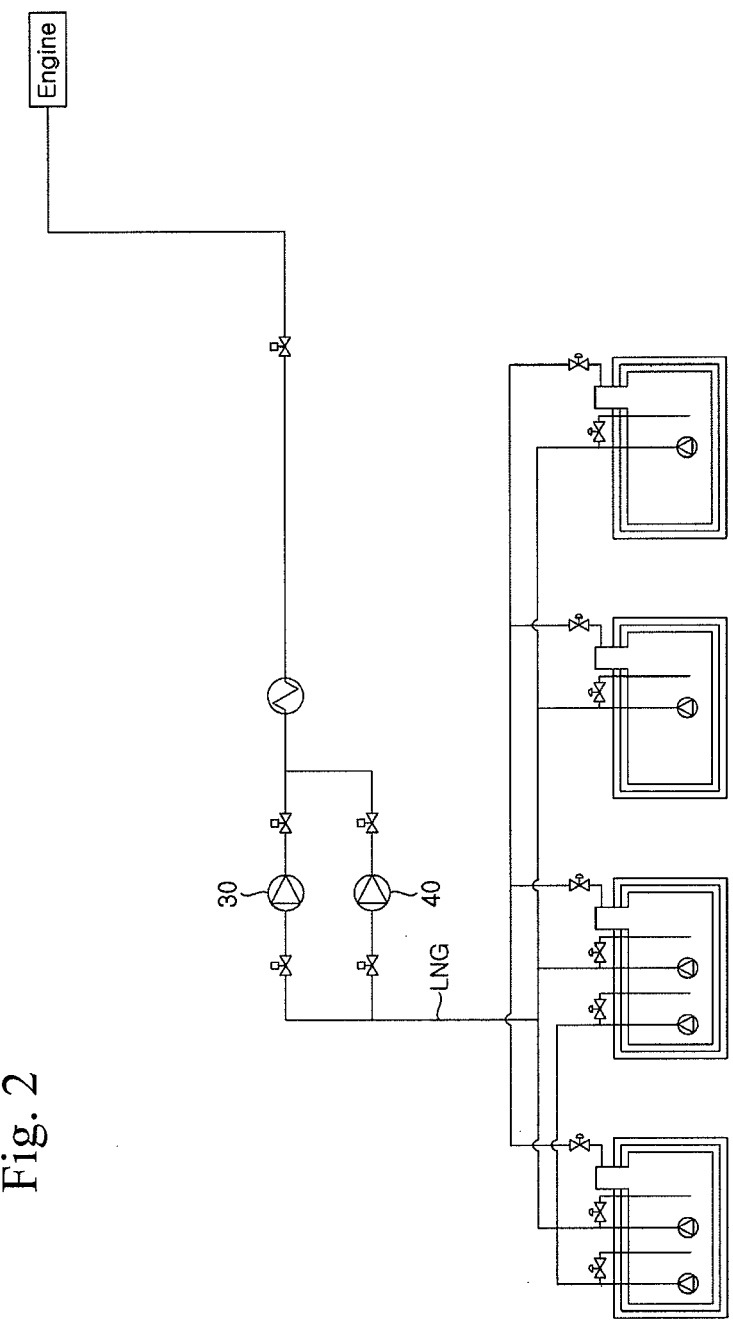
FIG. 2 schematically illustrates a system that includes two sets of pumps for redundancy of a fuel supply apparatus and supplies LNG to a high pressure gas injection engine as fuel.

Exemplary embodiments of the present invention will be described below in detail with reference to the accompanying drawings. These embodiments are provided so that this disclosure will be thorough and complete, and will fully convey the scope of the invention to those skilled in the art. The invention may, however, be embodied in many different forms and should not be construed as being limited to the embodiments set forth herein. Throughout the drawings and description, like reference numerals will be used to refer to like elements.

Figure 3:
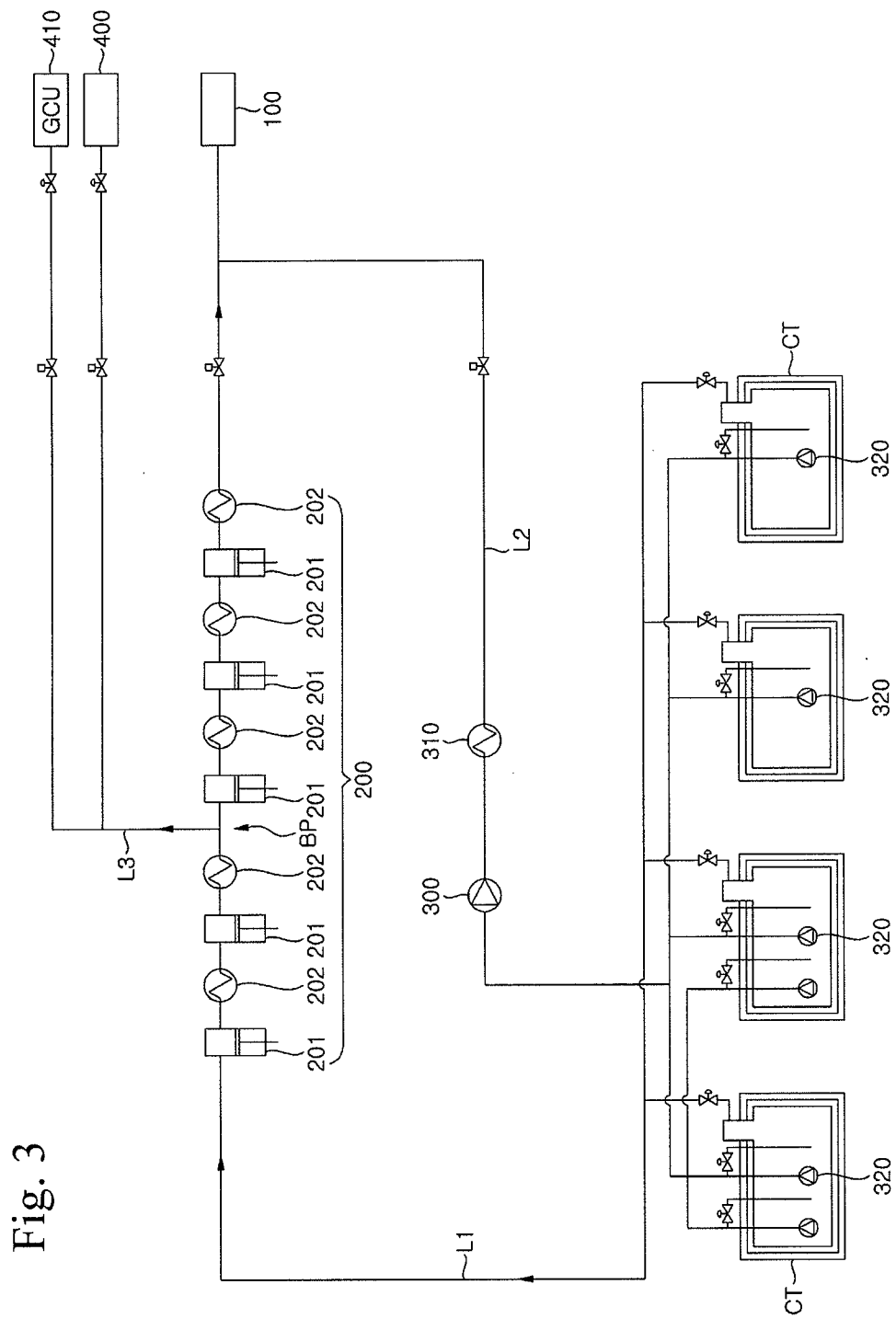
FIG. 3 schematically illustrates a configuration of a hybrid fuel supply system for an engine of a vessel according to a first embodiment of the present invention.

FIG. 3 schematically illustrates a configuration of a hybrid fuel supply system for an engine of a vessel according to a first embodiment of the present invention.

As illustrated in FIG. 3, the hybrid fuel supply system for the engine of the vessel according to the present invention includes a first passage L1, a second passage L2, and a compression device 200. The first passage L1 is connected to an LNG cargo tank CT of a vessel and is configured such that BOG generated from LNG stored in the LNG cargo tank CT is supplied to a high pressure gas injection engine 100 of the vessel. The second passage L2 is configured such that the LNG stored in the LNG cargo tank CT is pumped and vaporized and is then supplied to the high pressure gas injection engine 100. The compression device 200 is provided on the first passage L1 to compress the BOG. High pressure gas compressed at a high pressure of 150 to 400 bar is used as the fuel of the high pressure gas injection engine 100.

In the present embodiment, when an amount of BOG generated in the LNG cargo tank CT satisfies an amount of fuel necessary for the high pressure gas injection engine 100, the BOG may be supplied through the first passage L1, and when an amount of BOG generated in the LNG cargo tank CT is smaller than an amount of fuel necessary for the high pressure gas injection engine 100, pumped and vaporized LNG alone may be supplied, or pumped and vaporized LNG may be supplied as much as a shortage of fuel. As described above, according to the present embodiment, the fuel supply passage is configured with the redundancy of the first passage L1 and the second passage L2. Extra equipment (for example, additional compressor) provided only for satisfying the redundancy while not being used at regular days is not provided.

The redundancy is design such that extra equipment is provided to be in a standby state during the operation of main equipment for performing required functions, and takes over the function and performs the functions when the main equipment does not operate due to malfunction or the like. Mainly, extra equipment for satisfying such redundancy is redundantly designed with respect to rotating equipment. In the fuel supply system of the present embodiment, the compression device or the pump corresponds to the redundancy.

For example, the high pressure gas injection engine 100 may operate while being supplied with BOG compressed by the compression device 200 in a laden condition of the vessel, and may operate while being supplied with LNG stored in the LNG cargo tank CT after pumping and vaporization in a ballast condition the vessel.

The laden condition refers to a condition in which LNG is loaded about 98% of the tank volume with respect to the full loading of LNG in the LNG cargo tank CT of the LNG carrier. In the laden condition, a large amount of BOG is generated in the LNG cargo tank CT. The ballast condition refers to a condition in which LNG is unloaded and thus a small amount of LNG is stored in the LNG cargo tank CT. In the ballast condition, a small amount of BOG is generated. In the present embodiment, the system is configured to effectively supply fuel to the marine propulsion engine according to the laden condition or the ballast condition while supplying BOG to the marine propulsion engine in order to effectively utilizing a large amount of BOG generated in the LNG cargo tank CT of the vessel, in particular, the LNG carrier.

Although there is a difference according to the volume of the cargo tank, outside temperature, and the like, an amount of BOG generated in the LNG cargo tank CT is 3 to 4 ton/h in the laden condition and is 0.3 to 0.4 ton/h in the ballast condition in the case of the vessel having the volume of 150,000. It is known that a main engine gas injection (ME-GI) engine, which is a type of the high pressure gas injection engine 100, requires a fuel of 1 to 4 ton/h according to a load. Meanwhile, in recent years, since a boil-off rate (BOR) has tended to be lowered due to the improvement in the heat insulation performance of the vessel, a generation amount of BOG has tended to be reduced.

In the present embodiment, the compression device 200 may be configured in a multi-stage including a plurality of compressor 201 and a plurality of intercooler 202. The compression device 200 may be provided with only one set including such a multi-stage.

Meanwhile, a high pressure pump 300 and a vaporizer 310 may be provided on the second passage L2. The high pressure pump 300 is configured to be supplied with LNG from the LNG cargo tank CT and pump the LNG at a high pressure. The vaporizer 310 is configured to vaporize the LNG pumped by the high pressure pump 300 and supply the vaporized LNG to the high pressure gas injection engine 100. A fuel gas (FG) pump 320 may be provided in the LNG cargo tank CT. The FG pump 320 is configured to supply the LNG to the high pressure pump 300.

The high pressure gas injection engine 100 may be an ME-GI engine configured to be supplied with high pressure gas compressed at 150 to 400 bar as fuel.

The ME-GI engine is usable in the vessel, and is a 2-stroke high pressure natural-gas injection engine that has been developed for reducing emission of nitrogen oxide (NOx) and sulfur oxide (SOx) and can use gas and oil as fuel. The ME-GI engine may be installed in a marine structure, such as an LNG carrier, which transports LNG while storing it in the cargo tank withstanding a cryogenic temperature. The ME-GI engine uses natural gas or oil as fuel. The ME-GI engine requires a high gas supply pressure of about 150 to 400 bara (absolute pressure) according to a load. In addition, as compared with the diesel engine of the same power, the ME-GI engine can reduce emission of contaminant. For example, the ME-GI engine can reduce the emission of carbon dioxide by 23%, the emission of nitrogen compound by 80%, and the emission of sulfur compound by 95% or more. Therefore, the ME-GI engine is considered as a next-generation environmental-friendly engine.

About 2-MW power is consumed for supplying compressed fuel to the ME-GI engine by driving one set of the compression device 200 configured with the multi-stage. In the case of the high pressure pump 300, about 100-kW power is consumed. If considering only power consumption at the time of fuel supply, it is advantageous to configure only the high pressure pump 300. However, as described above, it is necessary to reliquefy or burn a large amount of BOG generated in the LNG cargo tank CT. Therefore, in the present embodiment, the system is configured with one set of the compression device 200 capable of supplying BOG as fuel, and the high pressure pump 300 and the vaporizer 310 capable of pumping, vaporizing and supplying LNG in consideration of the efficient utilization, power consumption, system configuration costs, redundancy, and the like.

In the present embodiment, since the redundant fuel supply passages are provided, it is preferable to configure only one set of the compression device 200. However, additional compressors (not illustrated) may be provided for consuming BOG by more stably supplying the high pressure gas injection engine 100 with BOG generated in the LNG cargo tank CT as fuel.

Even in the case of the marine structure or the vessel mounted with the ME-GI engine that pumps and forcibly vaporizes LNG and consumes the LNG as fuel, BOG processing apparatuses, such as a reliquefaction apparatus and a GCU 410, are still required for processing the BOG generated in the LNG cargo tank CT. However, in the present embodiment, an amount of BOG reliquefied or burnt can be reduced by configuring the hybrid fuel supply system to selectively supply BOG and LNG fuel according to a condition. One ME-GI engine or a plurality of ME-GI engines may be provided in the vessel of the present embodiment.

The present embodiment may be operated as follows, depending on an amount of BOG generated in the LNG cargo tank CT.

First, in the case of the laden condition in which an amount of BOG generated is large enough to satisfy an amount of fuel necessary for the high pressure gas injection engine 100, the BOG is supplied after being compressed to a pressure necessary for the high pressure gas injection engine 100 by the compression device 200 provided on the first passage L1.

As described above, the compression device 200 may be configured in a multi-stage in which the plurality of compressors 201 and the plurality of intercoolers 202 are alternately arranged. The compression device 200 may be configured in various forms according to the temperature and pressure conditions of natural gas necessary for the high pressure gas injection engine 100.

In the case of the ballast condition in which a small amount of BOG is generated in the LNG cargo tank CT or in the case where malfunction occurs on the first passage L1, LNG is compressed by the high pressure pump 300 to a pressure necessary for the high pressure gas injection engine 100, for example, 150 to 400 bara in the case of the ME-GI engine, is forcibly vaporized by the vaporizer 310, and is then supplied to the high pressure gas injection engine 100. At this time, the high pressure pump 300 is provided on an upper deck, and LNG stored in the LNG cargo tank CT is transferred to the high pressure pump 300 by the FG pump 320. In order to satisfy the redundancy and the reliability of the equipment, a plurality of high pressure pumps 300 may be provided in parallel in a stage prior to the vaporizer 310.

Since the LNG compressed by the high pressure pump 300 is in a supercritical state higher than a critical pressure, vaporization in the vaporizer 310 does not mean a phase change from liquid to gas, but means supply of heat energy to compressed LNG In the present embodiment, a third passage L3 branched from the first passage L1 may be provided to supply a dual fuel diesel engine (DFDE) 400 or a GCU 410 with BOG exceeding an amount of fuel necessary for the high pressure gas injection engine 100.

The DFDE 400 can burn both heavy oil and natural gas, or can selectively use heavy oil and natural gas as fuel. Since a content of sulfur is smaller than that in the case where only heavy oil is used as fuel, a content of sulfur oxide is small in exhaust gas.

In the present embodiment, in the compression device 200 in which the compressors 201 and the intercoolers 202 are configured in the multi-stage, the third passage L3 may be branched from the first passage L1 at a position where BOG is compressed at a pressure necessary for the DFDE 400.

When an amount of BOG generated in the LNG cargo tank CT does not exceed an amount of fuel necessary for the ME-GI engine just like the ballast condition or the like, this may be supplied to the DFDE 400 through a part of the multi-stage compression device 200. If supplied to the DFDE 400 through two compressors of five compressors 201 of the compression device 200, the remaining three compressors 201 run idle. However, while power required by the compression device 200 so as to supply BOG to the ME-GI engine is about 2 MW, power necessary for a part of the compression device 200 to run idle so as to supply BOG to the DFDE 400 is about 600 kW. When LNG is supplied to the ME-GI engine after pumping and vaporization, power consumed in the high pressure pump 300 is about 100 kW. Therefore, when an amount of BOG generated is smaller than an amount of fuel necessary for the high pressure gas injection engine 100 just like the ballast condition, it is advantageous to supply BOG to the DFDE 400 in terms of power consumption. However, if necessary, even when an amount of BOG is smaller than an amount of fuel for the high pressure gas injection engine 100, LNG may be supplied to the high pressure gas injection engine 100 by pumping and forcibly vaporizing LNG as much as a deficient amount, while supplying BOG to the high pressure gas injection engine 100.

Meanwhile, since a small amount of BOG is generated in the ballast condition, BOG may be accumulated and then intermittently supplied to the DFDE 400.

In the ballast condition, the engine of the vessel (that is, high pressure gas injection engine 100) may be simultaneously supplied with BOG compressed by the compression device 200 and LNG compressed by the high pressure pump 300 as fuel. In addition, in the ballast condition, the engine of the vessel (that is, high pressure gas injection engine 100) may be alternately supplied with BOG compressed by the compression device 200 and LNG compressed by the high pressure pump 300 as fuel.

According to another aspect of the present invention, there is provided a hybrid fuel supply method for an engine of a vessel, in which BOG generated from LNG stored in the LNG cargo tank CT of the vessel is compressed and then supplied to the high pressure gas injection engine 100, or LNG is supplied to the high pressure gas injection engine 100 after pumping and forcible vaporization. Therefore, the BOG or the LNG is selectively supplied to the high pressure gas injection engine, and the high pressure gas injection engine uses the high pressure gas compressed at a high pressure of 150 to 400 bar as fuel. BOG compression equipment and LNG pumping and vaporization equipment are provided with only one set, respectively.

The compression device 200 may be provided with only one set configured in a multi-stage including a plurality of compressor 201 and a plurality of intercooler 202.

As described above, in the hybrid fuel supply system for the engine of the vessel according to the present embodiment, the first passage L1 and the second passage L2 are provided in the vessel equipped with the high pressure gas injection engine 100. When an amount of BOG generated in the LNG cargo tank CT satisfies an amount of fuel necessary for the high pressure gas injection engine 100, BOG is supplied through the first passage L1. When an amount of BOG generated is smaller than an amount of fuel necessary for the high pressure gas injection engine 100, pumped and vaporized LNG is supplied to the high pressure gas injection engine 100, or a deficient amount of fuel is supplemented with pumped and vaporized LNG while supplying BOG.

When a large amount of BOG is generated in the LNG cargo tank CT of the vessel, for example, in the laden condition, BOG is compressed and then supplied as the fuel of the high pressure gas injection engine 100. When a small amount of BOG is generated, for example, in the ballast condition, the system is configured such that LNG can be supplied to the high pressure gas injection engine 100. Therefore, it is possible to stably supply fuel to the engine while satisfying the redundancy and to effectively utilize BOG while reducing an amount of BOG wasted by combustion in the GCU 410.

In addition, the redundancy is satisfied by configuring the first passage L1 and the second passage L2, and the number of compressors is reduced by configuring only one set of the compression device 200. Therefore, it is possible to configure a compact system and reduce the installation and management costs of the system.

Figure 4:
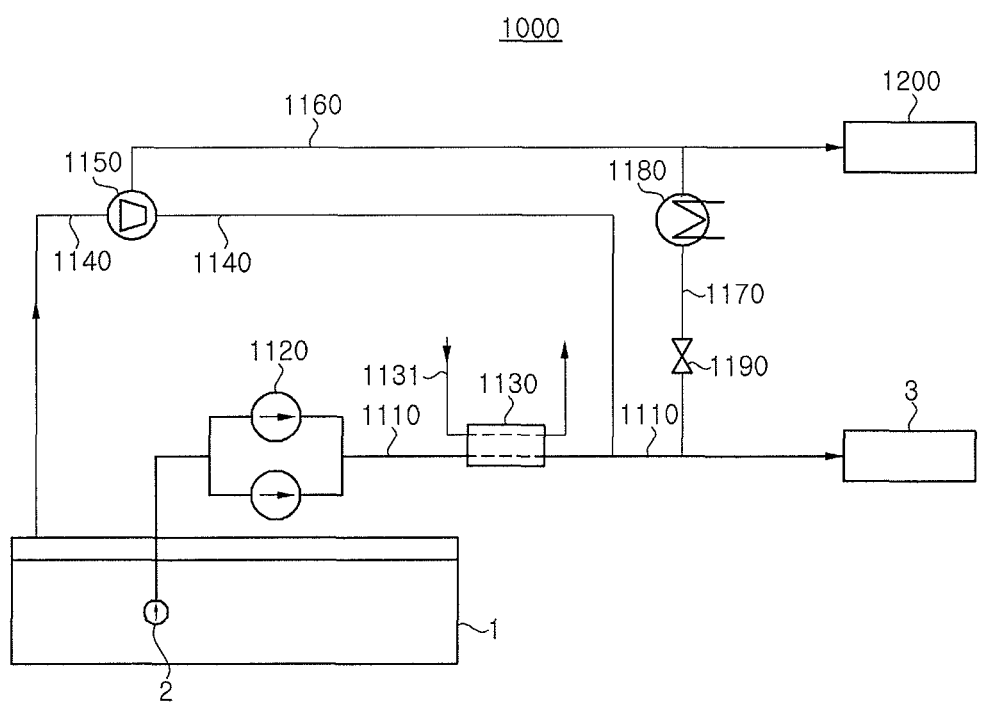
FIG. 4 schematically illustrates a hybrid fuel supply system according to a second embodiment of the present invention.

FIG. 4 is a configuration diagram illustrating a hybrid fuel supply system according to a second embodiment of the present invention. The hybrid fuel supply system according to the present invention may be applied to an LNG carrier equipped with an ME-GI engine as a main propulsion engine.

Referring to FIG. 4, the hybrid fuel supply system 1000 according to the embodiment of the present invention includes a fuel supply line 1110 and a BOG line 1140. The fuel supply line 1110 is configured to provide a passage for transferring LNG from a cargo tank 1 to a main engine 3. The BOG line 1140 is configured to provide a passage for transferring BOG generated from the cargo tank 1 to the main engine 3. In addition, the hybrid fuel supply system 1000 using BOG according to the embodiment of the present invention supplies LNG to the main engine 3 as fuel through the fuel supply line 1110 by an LNG pump 1120 and an LNG vaporizer 1130, supplies BOG to the main engine 3 as fuel through the BOG line 1140 after compressing the BOG by a BOG compressor 1150, and supplies surplus BOG from the BOG compressor 1150 to an integrated inert gas generator/gas combustion unit (IGG/GCU) system 1200.

The fuel supply line 1110 provides a passage through which LNG supplied from the LNG cargo tank 1 by the driving of a transfer pump 2 is transferred to the main engine 3 as fuel, and the LNG pump 1120 and the LNG vaporizer 1130 are installed therein.

The LNG pump 1120 is installed in the fuel supply line 1110 to provide a pumping force necessary for transferring the LNG. As an example of the LNG pump 1120, an LNG high pressure (HP) pump may be used. Like the present embodiment, a plurality of LNG pumps 1120 may be installed in parallel.

The LNG vaporizer 1130 is installed at a rear end of the LNG pump 1120 in the fuel supply line 1110 and vaporizes LNG transferred by the LNG pump 1120. As an example, LNG is vaporized by heat exchange with a heat medium circulated and supplied through a heat medium circulation line 1131. As another example, a variety of heating means, including heaters, may be used for providing a vaporization heat of LNG. In addition, the LNG vaporizer 1130 may use a high pressure (HP) vaporizer that can be used at a high pressure for vaporization of LNG. Meanwhile, as an example of the heat medium circulated and supplied through the heat medium circulation line 1131, steam generated from a boiler or the like may be used.

The BOG line 1140 provides a passage for transferring BOG naturally generated from the cargo tank 1 to the main engine 3. Like the present embodiment, the BOG line 1140 is connected to the fuel supply line 1110 to supply BOG to the main engine 3 as fuel. Alternatively, the BOG line 1140 may provide a passage for directly supplying BOG to the main engine 3.

The BOG compressor 1150 is installed in the BOG line 1140 to compress BOG passing through the BOG line 1140. Like the present embodiment, the single BOG compressor 1150 may be installed in a branched portion of a surplus BOG line 1160 in the BOG line 1140, thereby reducing burdens on costs for installation of the expensive BOG compressor 1150 and burdens on maintenance.

The surplus BOG line 1160 provides a passage for supplying surplus BOG from the BOG compressor 1150 to an integrated IGG/GCU system 1200. The surplus BOG line 1160 can supply surplus BOG as fuel to an auxiliary engine as well as the integrated IGG/GCU system 1200.

The integrated IGG/GCU system 1200 is a system in which the IGG and the GCU are integrated.

Meanwhile, the surplus BOG line 1160 and the fuel supply line 1110 may be connected together by a connection line 1170. Therefore, due to the connection line 1170, surplus BOG can be used as the fuel of the main engine 3, or vaporized LNG can be used as the fuel of the integrated IGG/GCU system 1200. A heater 1180 may be installed in the connection line 1170 so as to heat BOG or vaporized LNG passing therethrough, and a pressure reduction valve (PRV) 1190 may be installed to reduce excessive pressure by adjusting a pressure caused by BOG or vaporized LNG. Meanwhile, the heater 1180 may be a gas heater using combustion heat of gas. Also, the heater 1180 may use a variety of heating means, including a heat medium circulation/supply unit providing a heat source for heating by the circulation of the heat medium.

The operation of the hybrid fuel supply system according to the present invention will be described below.

When a pressure inside the cargo tank 1 is equal to or higher than a set pressure, BOG is compressed by the driving of the BOG compressor 1150 and is then supplied as fuel to the main engine 3. Therefore, the pressure inside the cargo tank 1 can be adjusted. In addition, when the pressure inside the cargo tank 1 is lower than the set pressure, LNG is transferred and vaporized by the driving of the LNG pump 1120 and the LNG vaporizer 1130 and is then supplied as fuel to the main engine 3. Therefore, the pressure inside the cargo tank 1 can be adjusted.

Meanwhile, surplus BOG from the BOG compressor 1150 is supplied to the integrated IGG/GCU system 1200 through the surplus BOG line 1160. The surplus BOG is consumed or is used for generating inert gas for supply to the cargo tank 1. Furthermore, the surplus BOG may be used as the fuel of the auxiliary engine or the like.

The integrated IGG/GCU system 1200 supplied with BOG may consume BOG continuously generated from the cargo tank 1 by BOG combustion inside a main body (not illustrated) and may, if necessary, generate combustion gas as inert gas for supply to the cargo tank 1.

While the embodiments of the present invention have been described with reference to the specific embodiments, it will be apparent to those skilled in the art that various changes and modifications may be made without departing from the spirit and scope of the invention as defined in the following claims.

What is claimed is:

1. A vessel comprising:
    at least one liquefied natural gas (LNG) tank configured to contain liquid phase LNG and boil-off gas (BOG);
    a BOG processing circuit comprising a multi-stage compressor configured to process BOG from the at least one LNG tank to generate supercritical state LNG without re-liquefaction of the BOG, the multi-stage compressor comprising a serially connected compressors;
    an LNG processing circuit comprising a first pump and a second pump and at least one heater connected to the first and second pumps, wherein each of the first and second pumps is configured to pressurize liquid phase LNG from the at least one LNG tank to a first pressure greater than a predetermined critical pressure, wherein the at least one heater is configured to receive and heat at least part of the pressurized liquid phase LNG for generating supercritical state LNG, wherein the first and second pumps are arranged in parallel for providing redundancy; and
    at least one engine configured to burn supercritical state LNG and connected to the BOG processing circuit and the LNG processing circuit for receiving supercritical state LNG from either or both of the BOG processing circuit and the LNG processing circuit,
    wherein the BOG processing circuit and the LNG processing circuit are arranged in parallel between the at least one LNG tank and the at least one engine, wherein the multi-stage compressor of the BOG processing circuit and the first second pumps of the LNG processing circuit are arranged in parallel between the at least one LNG tank and the at least one engine such that the vessel does not comprise and require a redundancy multi-stage compressor that would substitute the multi-stage compressor as either or both of the first and second pumps can be used in case the multi-stage compressor is out of order during voyage.

2. The vessel of claim 1, wherein the vessel is an LNG carrier having a capacity of 130,000 to 350,000 m$^3$.

3. The vessel of claim 1, wherein the multi-stage compressor further comprises at least one intercooler interposed between two immediately neighboring ones of the serially connected compressors.

4. The vessel of claim 1, wherein the vessel is configured to operate the BOG processing circuit to generate and supply supercritical LNG to the engine during laden voyage.

5. The vessel of claim 1, wherein the vessel is configured to operate the LNG processing circuit to generate and supply supercritical LNG to the engine during ballistic voyage.

6. The vessel of claim 1, further comprising a gas fuel combustion device configured to burn BOG from the at least one LNG tank.

* * * * *